United States Patent [19]

Leemkuil et al.

[11] Patent Number: 4,880,099

[45] Date of Patent: Nov. 14, 1989

[54] TILTING REVERSIBLE BELT TRANSFER MECHANISM

[75] Inventors: Hendrik Leemkuil, Pickerington; Eugene A. Zilber, Columbus, both of Ohio

[73] Assignee: Versa Corporation, Mount Sterling, Ohio

[21] Appl. No.: 259,036

[22] Filed: Oct. 17, 1988

[51] Int. Cl.⁴ .............................................. B65G 47/46
[52] U.S. Cl. ...................................... 198/371; 198/372
[58] Field of Search ............... 198/371, 372, 790, 809, 198/457, 597, 598

[56] References Cited

U.S. PATENT DOCUMENTS

| | | |
|---|---|---|
| Re. 25,673 | 11/1964 | Burt . |
| 1,980,261 | 11/1934 | Fenton . |
| 2,613,790 | 10/1952 | Schottelkolte . |
| 2,942,718 | 6/1960 | Buhrer . |
| 2,985,274 | 5/1961 | Byrnes et al. . |
| 2,988,196 | 6/1961 | Byrnes et al. . |
| 3,018,873 | 1/1962 | Burt . |
| 3,058,565 | 10/1962 | Byrnes . |
| 3,058,567 | 10/1962 | Byrnes et al. . |
| 3,104,004 | 9/1963 | Poel et al. . |
| 3,138,238 | 6/1964 | De Good et al. . |
| 3,191,747 | 6/1965 | Pollard . |
| 3,219,166 | 11/1965 | Collins et al. . |
| 3,241,651 | 3/1966 | Colby . |
| 3,254,752 | 6/1966 | Bauch et al. . |
| 3,279,583 | 10/1966 | Abegglen . |
| 3,303,923 | 2/1967 | Davis . |
| 3,334,723 | 8/1967 | Reed et al. . |
| 3,370,685 | 2/1968 | Guilie . |
| 3,429,417 | 2/1969 | De Good et al. . |
| 3,456,773 | 7/1969 | Titmas, Jr. . |
| 3,512,638 | 5/1970 | Chengges et al. . |
| 3,680,692 | 8/1972 | Southworth ................. 198/367 X |
| 3,747,736 | 7/1973 | Kornylak . |
| 3,983,988 | 10/1976 | Maxted et al. . |
| 4,111,087 | 9/1978 | Pankratz et al. . |
| 4,173,274 | 11/1979 | Kantarian et al. . |
| 4,174,774 | 11/1979 | Bourgeois ................ 198/809 X |
| 4,256,222 | 3/1981 | Gernti . |
| 4,264,002 | 4/1981 | Van Der Schie . |
| 4,328,889 | 5/1982 | Maxted . |
| 4,372,442 | 2/1983 | Fleischauer . |
| 4,565,283 | 1/1986 | Greenlee, III . |
| 4,598,815 | 7/1986 | Adama . |
| 4,730,718 | 3/1988 | Fazio et al. ................. 198/372 |
| 4,798,275 | 1/1989 | Leemkuil et al. .............. 198/372 |

FOREIGN PATENT DOCUMENTS

| | | |
|---|---|---|
| 2728061 | 1/1979 | Fed. Rep. of Germany . |
| 1531607 | 7/1968 | France ................. 198/372 |
| 56-75318 | 6/1981 | Japan . |

*Primary Examiner*—Robert J. Spar
*Assistant Examiner*—D. Glenn Dayoan
*Attorney, Agent, or Firm*—Litman, McMahon & Brown

[57] ABSTRACT

A tilting reversible belt transfer mechanism includes a cradle frame pivotally mounted across a conveyor frame and having belt supporting sheaves on opposite sides, an idler sheave at one end, and a drive sheave at the other end. A diverter belt is supported on the sheaves with transfer portions extending along upper edges of the frame sides. A conveyor roller is geared to the drive sheave and engaged by a power takeoff belt engaging a line shaft of the conveyor. As the drive sheave rotates, the transfer portions of the belt travel in opposite transverse directions. A linear motor arrangement is connected between the cradle frame and the conveyor frame and is operated to pivot the cradle frame in opposite directions about a non-divert position to lift a respective one of the belt transfer portions above the conveyor surface plane to engage and article and move it in an associated transverse direction.

24 Claims, 2 Drawing Sheets

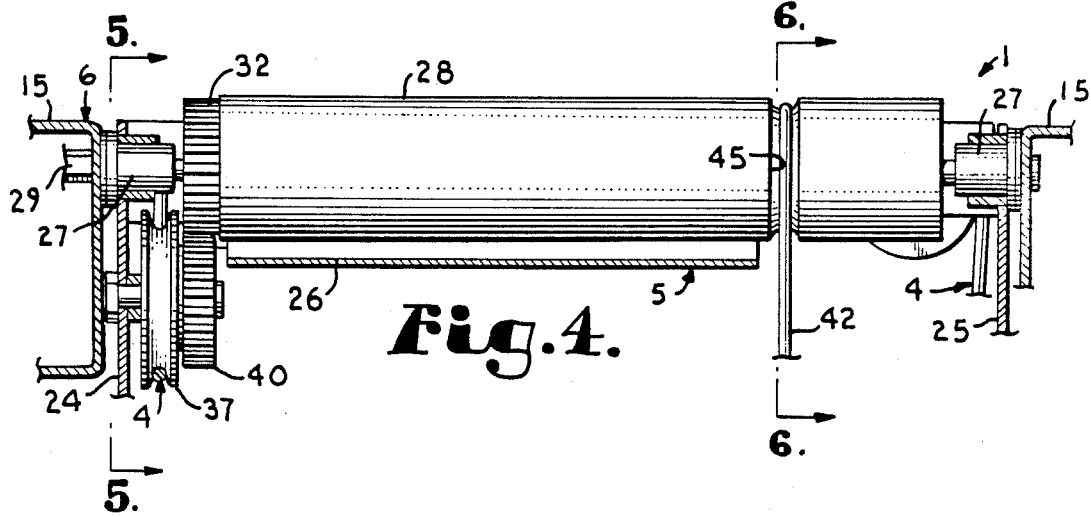
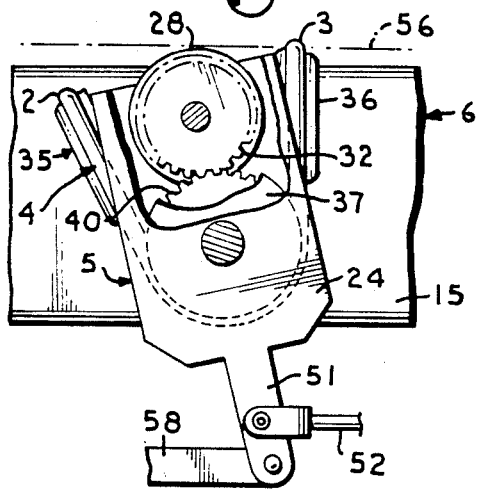
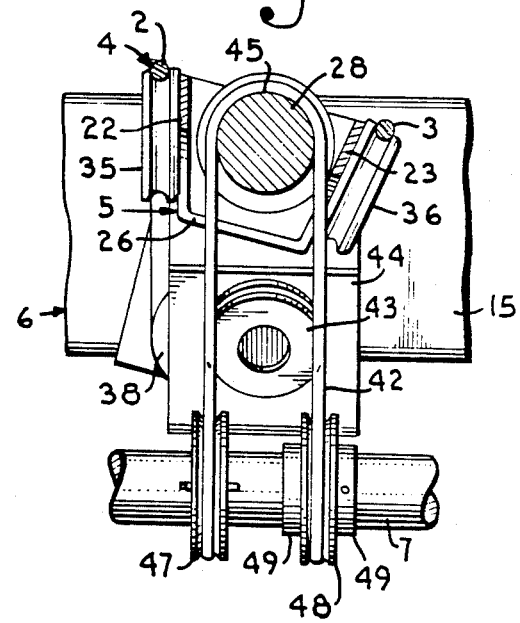
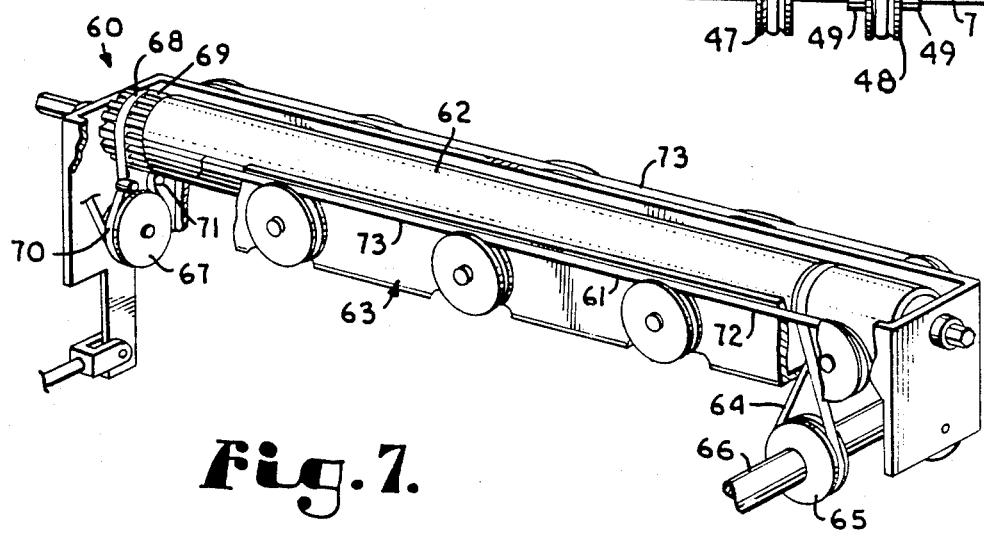

TILTING REVERSIBLE BELT TRANSFER MECHANISM

FIELD OF THE INVENTION

The present invention relates to transfer mechanisms for conveyors and, more particularly, to such a mechanism including a pair of belts running in opposite directions transverse to a conveyor and being pivoted about a transverse axis to engage one or the other belt with an article to transfer the article in a respective direction.

BACKGROUND OF THE INVENTION

Transfer or diverter mechanisms are often desirable in conveyor systems for transferring conveyed articles from one conveyor to another or to a work station or the like. Transfer mechanisms range in complexity from simple barrier type diverters which deploy an arm diagonally across the main conveyor, through linear diverters wherein a bumper extends across the conveyor and pushes the article off one conveyor to another, to pop-up diverters of various kinds which are extended above the transfer surface of the conveyor to engage an article thereon for diversion purposes.

A desirable characteristic of a transfer mechanism on a powered conveyor is to have transfer elements on the mechanism driven by the same source of drive as the main conveyor to avoid the expense of a separate transfer drive motor. When the transfer mechanism has to be lifted into contact with articles on the main conveyor, complications arise from the need to maintain driving engagement between a main conveyor drive member and the transfer element. When belts are employed to transfer drive from a main conveyor drive member and a transfer element, a typical power takeoff arrangement pivots a frame supporting the transfer element such that the takeoff belt is pivoted about the rotational axis of the conveyor drive member. This avoids stretching the takeoff belt. In other arrangements, the takeoff belt is loose in a nondivert position of the transfer frame and becomes taut when the transfer frame is lifted to contact an article to be diverted. In still other arrangements, the takeoff belt is allowed to stretch.

Line shaft driven roller conveyors present particular problems when transfer mechanisms are driven by belts engaged with the line shaft. In a line shaft driven roller conveyor, power is transmitted from a rotary motor to conveyor rollers by an elongated line shaft extending the length of the conveyor. Small endless belts, or 0-rings, transmit rotation from the line shaft to the rollers. When belts are employed to transmit rotation, incidents occur in which the belts may be broken or stretched to a degree that they no longer frictionally engage the members between which rotation is to be transferred. Because of the length of some line shafts and the number of support bearings required therefor, removal of such line shafts for maintenance reasons is desirably minimized because of the labor and downtime involved.

In a conveyor with drop-in type rollers driven by a line shaft, a common practice is to provide extra roller driving belts on the line shaft to avoid displacing the line shaft merely to replace a roller driving belt. In the case of transfer mechanisms driven by a takeoff belt from a line shaft, it is desirable to configure the arrangement in such a manner that the belt can be replaced without removal of the line shaft.

SUMMARY OF THE INVENTION

The present invention is a tilting reversible belt transfer mechanism which is particularly adapted for use with line shaft driven roller conveyors, although it could be modified somewhat for use with other types of conveyors. The mechanism includes a cradle frame having frame ends pivotally connected to the conveyor side rails to pivot about a cradle axis transverse to the direction of travel on the conveyor. Transfer sheaves are positioned on side members of the cradle frame along with an idler sheave at one end and a drive sheave at the other end. An endless diverter belt is reeved or threaded about the sheaves with belt transfer portions positioned above the transfer sheaves and extending in a direction parallel to the cradle pivot axis. The sheaves are arranged in such a manner that when the diverter belt is driven, the transfer portions move in opposite directions.

The drive sheave has a drive gear which meshes with a roller gear on a roller extending through the cradle frame. A power takeoff belt is engaged between the roller and the line shaft of the conveyor. A linear motor is connected between a lever extending below one of the frame ends and is operated to pivot the cradle frame about its pivot axis. When the cradle frame is in a neutral position, both transfer portions of the diverter belt are below the plane of the conveyor surface. Pivoting the cradle frame in each direction about its axis from the neutral position lifts a respective one of the belt transfer portions above the conveyor surface plane to engage an article and move it in an associated transverse direction. Thus, an article is diverted in one transverse direction by pivoting the cradle in one direction about its axis or in the opposite transverse by pivoting the cradle in the opposite direction.

In a practical transfer arrangement employing the transfer mechanism of the present invention, at least two mechanisms are mounted in close proximity and linked together for pivoting in unison. Depending on the length of the articles to be diverted, additional linked transfer mechanisms might be required. In order to facilitate replacement of the power takeoff belt without removing the line shaft, the roller extending through the cradle frame is removable; and the takeoff belt has one end loop engaging the roller, another end loop engaging an idler, and a pair of intermediate belt portions respectively engaging a keyed pulley for driving engagement and a slipping pulley on the line shaft. The intermediate belt portions pass around the pulleys on the line shaft from the roller to the idler.

OBJECTS OF THE INVENTION

The principal objects of the present invention are: to provide an improved mechanism for transferring articles from a conveyor; to provide such a mechanism which is particularly adapted for use with line shaft driven roller conveyors; to provide such a mechanism which is powered by an endless takeoff belt from a line shaft; to provide such a mechanism which does not cause stretching of portions of the takeoff belt when deployed to transfer an article; to provide such a mechanism which is reversible for transferring toward either side of the conveyor; to provide such a mechanism in which deployment and reversing are accomplished by simply tilting in one direction to transfer toward one side of the main conveyor, neutralizing the tilt for nondeployment, and tilting in the other direction to transfer toward the other side of the main conveyor; to provide such a mechanism including a cradle shaped frame extending transverse to the main conveyor and having ends pivotally connected to the side rails of the main conveyor, sides with transfer belt supporting sheaves, an idler sheave at one end, a drive sheave at the other end, meshed gear engagement between the drive sheave and a conveyor roller extending through the cradle, and a takeoff belt engaged between the roller and a line shaft; to provide such a mechanism in which a diverter belt is supported on the sheaves and includes belt transfer portions supported on the side mounted sheaves and travelling in opposite transverse directions for diverting in one direction by lifting one belt transfer portion above the plane of the conveyor rollers and in an opposite direction by lifting the other belt transfer portion; to provide such a mechanism in which the takeoff belt may be replaced without removal of the line shaft from the main conveyor frame; to provide such a mechanism which is linked with at least one other similar mechanism for operation in unison; to provide such a mechanism which is retro-fittable to existing line shaft driven roller conveyors; to provide such a mechanism which is adaptable for use with types of conveyors other than line shaft driven roller conveyors; and to provide such a tilting reversible belt transfer mechanism which is economical to manufacture, simple in construction and operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a view similar to FIG. 3 with portions broken away to illustrate inner details of the transfer mechanism.

FIG. 5 is sectional view of the transfer mechanism taken on line 5—5 of FIG. 4 illustrates the transfer mechanism pivoted in a first direction to cause transfer of an article in a first transverse direction from the conveyor.

FIG. 6 is a sectional view of the transfer mechanism taken on line 6—6 of FIG. 4 and illustrates the transfer mechanism pivoted in a second direction to cause transfer of an article in an opposite second transfer direction from the conveyor.

FIG. 7 is a fragmentary perspective at a somewhat reduced scale of a modified embodiment of the transfer mechanism according to the present invention.

DETAILED DESCRIPTION OF THE INVENTION

Figure 1:
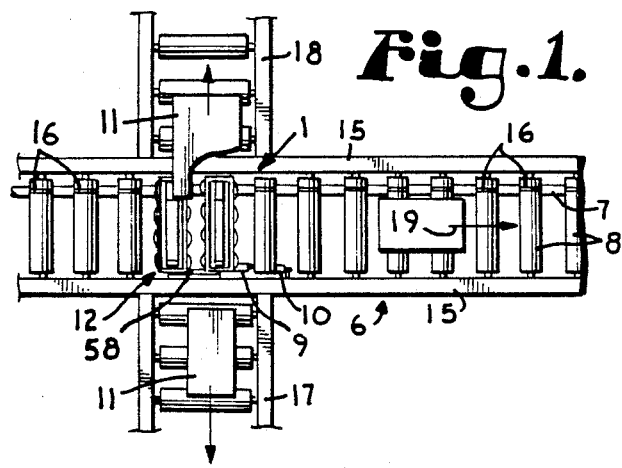
FIG. 1 is a top plan view at a reduced scale of a conveyor system in which a tilting reversible belt transfer mechanism embodying the present invention is installed.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed Referring to the drawings in more detail:

The reference numeral 1 generally designates a tilting reversible belt transfer mechanism embodying the present invention. The mechanism 1 generally includes transfer portions 2 and 3 of a diverter belt 4 supported on a cradle frame 5 which is pivotally connected across a conveyor frame 6. The diverter belt 4 is driven indirectly by a line shaft 7 which powers rollers 8 on the conveyor frame 6 and is arrayed on the cradle frame 5 so that the transfer portions 2 and 3 travel in opposite directions. The cradle frame 5 is tilted in opposite directions by a pair of tandem connected linear motors 9 and 10 from a neutral position to lift either of the transfer portions 2 or 3 to engage an article 11 to transfer the article off the conveyor frame 6. The mechanism 1 is normally linked with another mechanism 1 to form a transfer module 12 for operation in unison.

The illustrated conveyor frame 6 is a substantially conventional roller conveyor section formed of side rails 15 having the rollers 8 journaled therealong. The rollers 8 are rotated by the line shaft 7 by way of endless belts or 0-rings 16 which twist from the line shaft 7 to engage the rollers 8. The line shaft 7 is driven by a motor (not shown) which may be reversible to cause the propulsion of the articles 11 in opposite directions along the conveyor 6. FIG. 1 illustrates a right side conveyor 17 and a left side conveyor 18 (as referenced to a direction of travel 19 on the main conveyor frame 6) onto which it is desirable to selectively transfer articles 11 from the main conveyor 6. The conveyors 17 and 18 are illustrated as roller type conveyors oriented perpendicular to the main conveyor 6. However, for purposes of the present invention, the conveyors 17 and 18 need not be roller conveyors, and they can be oriented in a manner other than perpendicular to the main conveyor. In fact the conveyors 17 and 18 may be replaced with work stations of some sort.

Figure 2:
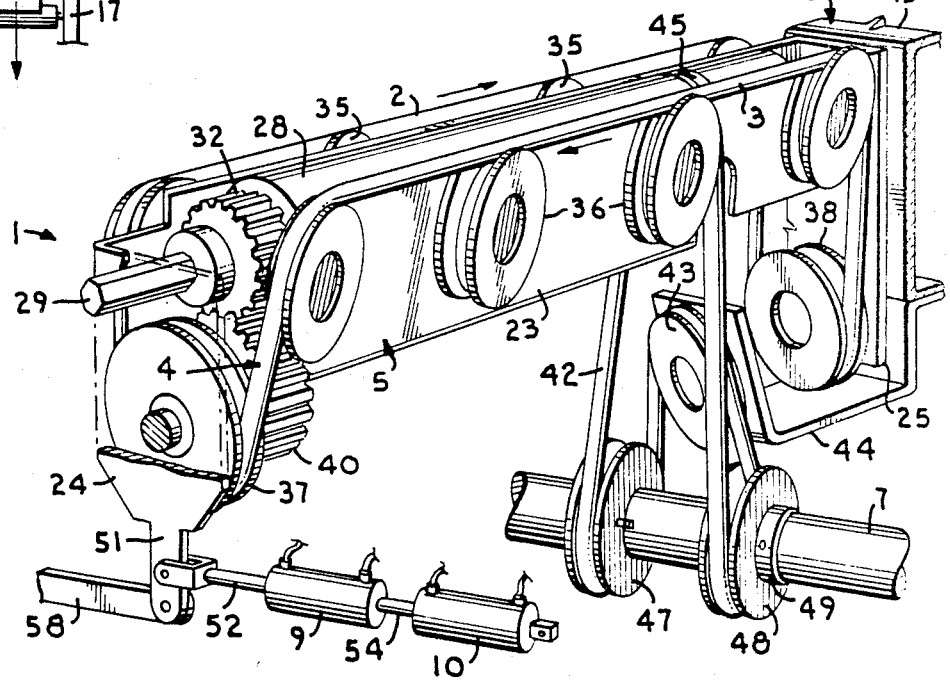
FIG. 2 is a fragmentary perspective view of the transfer mechanism with portions broken away to illustrate details of drive transmission gears thereof.
Figure 3:
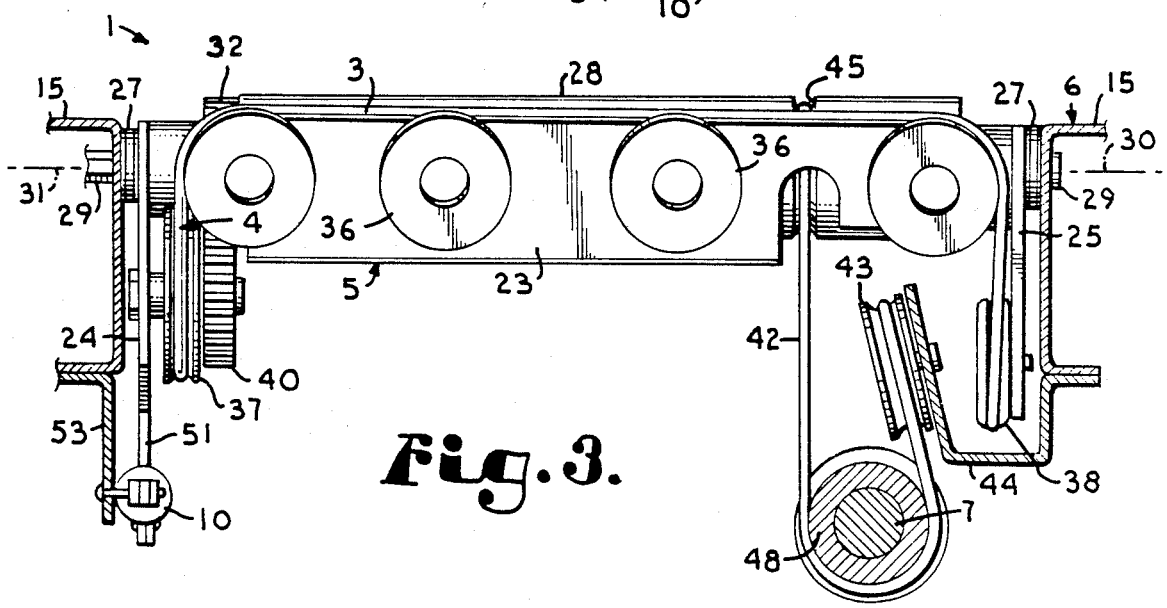
FIG. 3 is a fragmentary transverse elevational view of the transfer mechanism.

Referring to FIGS. 2, 3, and 6, the cradle frame 5 is formed of side walls 22 and 23, end walls 24 and 25, and a lower wall 26. As shown in FIGS. 5 and 6, the side walls 22 and 23 are angled inwardly toward the lower wall 26. The cradle frame 5 is pivotally connected to the conveyor frame 6 by aligned pivot bearings 27 engaged between the end walls 24 and 25 and the side rails 15 of the conveyor frame. A conveyor roller 28 extends through the cradle frame 5 between the side walls 22 and 23. The roller 28 has end trunnions 29 by which it is mounted between the side rails 15 of the conveyor frame 6, as by extending through the pivot bearings 27. A rotation axis 30 of the roller 28 is colinear with a pivot axis 31 of the cradle frame 5 (FIG. 4). The roller 28 is preferably removable from the conveyor frame 6, as by the trunnions 29 being resiliently urged outward and capable of being pressed inwardly to clear the pivot bearings 27. An end of the roller 28 near the end wall 24 has a spur gear 32 formed thereon.

Pluralities of transfer sheaves 35 and 36 are rotatably mounted respectively on the cradle frame side walls 22 and 23. Four transfer sheaves are illustrated on each side wall; however, the number required depends on the width of the conveyor frame 6. A drive sheave 37 is rotatably mounted on the end wall 24, and an idler sheave 38 is rotatably mounted on the end wall 25. The endless diverter belt 4 is reeved or threaded about the sheaves 35-38 by passing under the drive sheave 37, over the transfer sheaves 35, under the idler sheave 38, and over the transfer sheaves 36 back to the drive sheave 37. The portions of the belt 4 passing over and supported by the transfer sheaves 35 and 36 are designated the transfer portions 2 and 3, respectively, and extend substantially parallel to the cradle frame pivot axis 31. The manner in which the diverter belt 4 is reeved about the sheaves 35-38 causes the transfer portions 2 and 3 to travel in opposite transverse directions when the belt 4 is driven. The drive sheave 37 has a drive gear 40 affixed thereto and rotating therewith. The drive gear 40 meshes with the roller gear 32 such that when the roller 28 is rotated, the diverter belt 4 is driven about the sheaves 35-38.

The roller 28 is rotated by the line shaft 7 through an endless power takeoff belt 42. A takeoff idler pulley 43 is mounted on a bracket 44 on one of the conveyor side rails 15. The roller 28 has a circumferential belt groove 45 formed therein for engagement by the takeoff belt 42. A fixed pulley 47 is keyed to the line shaft 7, and a freewheeling pulley 48 is rotatably mounted on the line shaft 7, as by fixed collars 49. One end loop of the takeoff belt 42 engages the groove 45 in the roller 28 while the other end loop engages the idler pulley 43. Intermediate portions of the belt 42 between the end loops engage the pulleys 47 and 48 on the line shaft 7. The intermediate portions of the belt 42 travel in opposite directions with respect to the line shaft 7, thus, requiring the freewheeling pulley 48. If the power takeoff belt 42 should break, it may be replaced by removing the roller 28, slipping a new belt 42 on the roller, replacing the roller, placing the free end loop about the idler pulley 43, and placing the intermediate portions on the pulleys 47 and 48. There is no need to remove the line shaft 7.

The cradle frame 5 is tilted by operation of the tandem connected linear motors 9 and 10. A lever 51 extending downwardly from the cradle frame end wall 24 has a piston rod 52 of the cylinder 9 pivotally connected thereto. The cylinder 10 is pivotally connected to a bracket 53 (FIG. 3) attached to one of the conveyor side rails 15. A piston rod 54 of the cylinder 10 is nonpivotally connected to the cylinder 9. When only one of the pistons of motors 9 and 10 is extended, the cradle frame 5 is placed in the neutral position illustrated in FIG. 2. In the neutral position, both of the transfer portions 2 and 3 of the diverter belt 4 are below an article support plane 56 tangent to the upper surfaces of the conveyor rollers 8 and 28. When the pistons 52 and 54 of both motor 9 and 10 are retracted, the cradle frame 5 is tilted to raise the transfer portion 3 above the plane 56 (FIG. 5). When both pistons 52 and 54 are extended, the transfer portion 2 is raised above the plane 56 (FIG. 6). The two linear motors 9 and 10 are preferably double acting air cylinders. Alternatively other types of linear or rotary motors may be employed. Two linear motors are employed in the illustrated mechanism 1 in order to positively neutralize the tilt when diversion is not desired. Alternatively, other arrangements may be employed for this purpose.

Since the transfer portions 2 and 3 travel in opposite directions, reversing the direction of diversion or transfer from the conveyor 6 is accomplished by merely tilting the cradle frame 5 about its pivot axis 31. Since all portions of the diverter belt 4 are supported on the cradle frame 5, there is no stretching of the belt 4 during tilting. And since the takeoff belt 42 only engages the roller 28, the belt 42 is not stretched during tilting of the cradle frame 5.

In a preferred use of the mechanism 1, at least two of the mechanisms 1 which are linked together to form a transfer module 12 in which the mechanisms 1 are tilted in unison. Otherwise, an article 11 would not be lifted completely from the rollers 8 of the main conveyor 6. For this purpose, a link 58 is pivotally connected between the lever arm 51 of two adjacent mechanisms 1. The link 58 could, alternatively, be connected between other parts of the mechanisms 1. When the motors 9 and 10 are operated to tilt one of the mechanisms 1, the linked mechanism 1 is also tilted. If a conveyor 6 is intended primarily for conveying relatively long articles 11, it might be desirable to link together more than two transfer mechanisms 1 to form a transfer module 12.

FIG. 7 illustrates a modified embodiment of the tilting reversible belt transfer mechanism according to the present invention. The transfer mechanism 60 is somewhat simplified compared to the mechanism 1 and differs therefrom principally in the manner of driving a diverter belt 61 thereof. In the mechanism 60, a roller 62 extending through a cradle frame 63 thereof is rotated by a simple 0-ring type power takeoff belt 64 engaged directly between a pulley 65 keyed to a line shaft 66. The takeoff belt 64 is not as easily replaced on the mechanism 60 as on the mechanism 1 as a result of the absence of an end idler pulley and a freewheeling pulley on the line shaft 66. However, the overall structure of the mechanism 60 is simplified by the absence of these components. In a conveyor section with a relatively short line shaft 60 which can be removed with relative ease, the simplified structure of the mechanism 60 might be as appropriate as the mechanism 1.

The manner of transmission of drive from the roller 62 to the diverter belt 61 is also different in the mechanism 60. The diverter belt 61 engages a drive sheave 67 on one end wall of the cradle frame 63. Drive is transferred from the roller 62 to the drive sheave 67 by a toothed belt 68 engaged with gear teeth 69 on the roller 62 and with a geared section 70 of the drive sheave 67. The toothed belt 68 are tensioned for positive engagement with the gear teeth 69 and geared section 70 by tensioners 71 which may be adjustable. In other respects, the mechanism 60 is substantially similar to the mechanism 1.

It is to be understood that while certain forms of the present invention have been illustrated and described herein, it is not to be limited to the specific forms or arrangement of parts described and shown.

What is claimed and desired to be secured by Letters Patent is as follows:

1. A transfer mechanism comprising:
 (a) a cradle frame pivotally supported with respect to an article support to pivot about a cradle frame pivot axis;
 (b) an article diverter belt-like member supported on said cradle frame;

(c) transfer drive means engaged with said article diverter belt-like member to drive a transfer portion thereof in a transfer direction substantially parallel to said cradle frame pivot axis; and (d) cradle frame motive means engaged with said cradle frame and operable to pivot said cradle frame about said axis to engage said transfer portion of said diverter belt-like member with an article on said article support to thereby transfer said article from said article support in said transfer direction.

2. A mechanism as set forth in claim 1 wherein:

(a) said diverter belt-like member is a first diverter belt-like member and has a first transfer portion driven in a first transfer direction;

(b) a second diverter belt-like member is supported on said cradle frame in spaced relation to said first diverter member;

(c) said drive means is engaged with said second diverter member and drives a second transfer portion thereof in a second transfer direction substantially parallel to said cradle frame pivot axis and opposite to said first transfer direction; and (d) said cradle frame motive means is operable to pivot said cradle frame in a first pivot direction about said axis to engage said first transfer portion with an article on said article support to transfer sad article in said first transfer direction and is operable to pivot said cradle frame in a second pivot direction about said axis to engage said second transfer portion with an article on said article support to transfer an article in said second transfer direction.

3. A mechanism as set forth in claim 1 wherein:

(a) said diverter belt-like member is a belt supported on said cradle frame; and (b) said transfer portion is a belt portion of said belt extending in said transfer direction and being driven in said transfer direction by said drive means.

4. A mechanism as set forth in claim wherein said transfer drive means includes:

(a) a rotary drive member rotating about a drive axis perpendicular to said pivot axis and spaced therefrom.

5. A mechanism as set forth in claim 1 wherein:

(a) said cradle frame motive means is a linear motor engaged between said cradle frame and said article support and operative to pivot said cradle frame upon a length of said linear motor being changed.

6. A mechanism as set forth in claim 1 wherein said cradle frame, said cradle frame pivot axis, said diverter belt-like member, and said transfer drive means are respectively a first cradle frame, a first cradle pivot axis, a first diverter belt-like member, and a first transfer drive means; and including:

(a) a second cradle frame pivotally supported with respect to said article support to pivot about a second cradle frame pivot axis parallel to said first cradle frame pivot axis;

(b) a second article diverter belt-like member supported on said second cradle frame;

(c) second transfer drive means engaged with said second article diverter member to drive a second transfer portion thereof in said transfer direction; and (d) a link pivotally connected between said first cradle frame and said second cradle frame such that when said cradle frame motive means pivots said first cradle frame about said first cradle frame pivot axis, said second transfer frame is pivoted about said second cradle frame pivot axis to engage said second transfer portion with an article on said article support substantially simultaneously with the engagement of said first portion of said diverter belt-like member with said article.

7. A reversible transfer mechanism for a conveyor including a conveyor frame, said mechanism comprising:

(a) a cradle frame pivotally mounted on an elongated conveyor frame to pivot about a cradle frame pivot axis transverse to said conveyor frame;

(b) a diverter belt supported on said cradle frame and including a first belt transfer portion and a second belt transfer portion of said belt, said transfer portions extending transverse to said conveyor frame;

(c) diverter belt drive means engaged with said belt and driving same in such a manner that said transfer portions travel in opposite transfer directions substantially parallel to said axis; and (d) cradle frame motor means engaged between said conveyor frame and said cradle frame and operable to pivot said cradle frame in a first pivot direction about said axis to a first transfer position to lift said first transfer portion of said belt to engage and transfer an article on said conveyor frame in a first transfer direction and to pivot said cradle frame in a second pivot direction about said pivot axis to a second transfer position to lift said second transfer portion of said belt to engage and transfer an article on said conveyor frame in a second transfer direction.

8. A mechanism as set forth in claim 7 wherein said diverter belt drive means includes:

(a) a rotary drive member rotating about a drive axis perpendicular to said pivot axis and spaced therefrom; and (b) drive take off means drivingly engaged between said rotary member and said diverter belt.

9. A mechanism as set forth in claim 7 wherein:

(a) said cradle frame motor means includes linear motor means engaged between said cradle frame and said conveyor frame and operative to pivot said cradle frame upon a length of said linear motor means being changed.

10. A mechanism as set forth in claim 9 wherein said linear motor means includes:

(a) first and second linear motors connected in tandem between said cradle frame and said conveyor frame and cooperating in such a manner that retraction of both said linear motors pivots said cradle frame to said first transfer position, extension of only one of said linear motors pivots said cradle frame to a neutral position wherein neither of said belt transfer portions can engage an article on said conveyor frame, and extension of both of said linear motors pivots said cradle frame to said second transfer position.

11. A mechanism as set forth in claim 7 wherein said cradle frame, said cradle frame pivot axis, said diverter belt, and said diverter belt drive means are respectively a first cradle frame, a first cradle frame pivot axis, a first diverter belt, and a first diverter belt drive means; and including:

(a) a second cradle frame pivotally supported on said conveyor frame to pivot about a second cradle frame pivot axis parallel to said first cradle frame pivot axis;

(b) a second diverter belt supported on said second cradle frame and including a first belt transfer portion and a second belt transfer portion of said second diverter belt, said transfer portions extending transverse to said conveyor frame;

(c) second transfer belt drive means engaged with said second article diverter belt to drive said transfer portions of said second diverter belt respectively in said first and second transfer directions; and (d) a link pivotally connected between said first cradle frame and said second cradle frame such that when said frame motor means pivots said first cradle frame about said first cradle frame pivot axis to said first and second transfer positions, said second cradle frame is simultaneously pivoted about said second cradle frame pivot axis respectively to first and second transfer positions of said second cradle frame.

12. A mechanism as set forth in claim 7 wherein:

(a) said cradle frame includes opposite spaced apart first and second frame sides and opposite spaced apart frame ends, said cradle frame having said frame ends pivotally connected to said conveyor frame; and (b) said diverter belt is supported on said cradle frame such that said first transfer portion is movably supported on said first frame side and said second transfer portion is movably supported on said second frame side.

13. A mechanism as set forth in claim 12 including:

(a) a plurality of first transfer sheaves and a plurality of second transfer sheaves rotatably mounted respectively on said first frame side and said second frame side;

(b) an idler sheave is rotatably mounted on one of said frame ends and a drive sheave is rotatably mounted on an opposite one of said frame ends;

(c) said diverter belt being endless and being reeved about said transfer sheaves, said idler sheave, and said drive sheave; said first and second transfer portions of said belt being supported respectively by said first and second transfer sheaves; and (d) said belt drive means being drivingly engaged with said drive sheave to cause movement of said belt about said sheaves and to cause said first and second transfer portions to move in said opposite transfer directions.

14. A mechanism as set forth in claim 13 wherein said conveyor frame supports a plurality of transverse rollers journaled therealong and wherein:

(a) said cradle frame is positioned on said conveyor frame with said frame sides on opposite sides of a powered roller rotating on said conveyor frame; and (b) said belt drive means includes drive transmission means engaged between said powered roller and said drive sheave.

15. A mechanism as set forth in claim 14 wherein said drive transmission means includes:

(a) a roller gear rotating with said powered roller;
(b) a drive gear rotating with said drive sheave; and
(c) said roller gear being meshed with said drive gear.

16. A mechanism as set forth in claim 12 wherein said cradle frame motor means includes:

(a) linear motor means connected between one of said frame ends and said conveyor frame and selectively operable to pivot said cradle frame to said first and second transfer positions.

17. A reversible transfer mechanism for use with a roller conveyor having a plurality of rollers journaled along a conveyor frame and drivingly engaged with a line shaft, said mechanism comprising:

(a) a cradle frame including opposite spaced apart first and second frame sides and opposite spaced apart ends, said frame ends being pivotally connected to a conveyor frame such that said cradle frame is pivotable about a cradle frame pivot axis transverse to said conveyor frame;

(b) a plurality of first transfer sheaves and a plurality of second transfer sheaves rotatably mounted respectively on said first frame side and said second frame side;

(c) an idler sheave is rotatably mounted on one of said frame ends and a drive sheave is rotatably mounted on an opposite one of said frame ends;

(d) a endless diverter belt including a first belt transfer portion and a second belt transfer portion; said diverter belt being reeved about said transfer sheaves, said idler sheave and said drive sheave; said first and second transfer sheaves respectively supporting said first and second belt transfer portions such that they extend transverse to said conveyor frame and substantially parallel to said cradle frame pivot axis;

(e) a power takeoff belt drivingly engaged between a line shaft mounted on said conveyor frame to power rollers on said conveyor frame and said drive sheave and operative to cause said first and second belt transfer portions to travel in opposite respective first and second transfer directions substantially parallel to said axis; and (f) linear motor means engaged between said conveyor frame and said cradle frame and operable to pivot said cradle frame in a first pivot direction about said axis to lift said first belt transfer portion to engage and transfer an article on said conveyor frame in aid first transfer direction and to pivot said transfer frame in a second pivot direction about said axis to lift said second belt transfer portion to engage and transfer an article on said conveyor frame in said second transfer direction.

18. A mechanism as set forth in claim 17 wherein said linear motor means includes:

(a) first and second linear motors connected in tandem between said cradle frame and said conveyor frame and cooperating in such a manner that retraction of both said linear motors pivots said cradle frame to said first transfer position, extension of only one of said linear motors pivots said cradle frame to a neutral position wherein neither of said belt transfer portions can engage an article on said conveyor, and extension of both of said linear motors pivots said cradle frame to said second transfer position.

19. A mechanism as set forth in claim 17 wherein said cradle frame, said cradle frame pivot axis, said diverter belt, and said power takeoff belt are respectively a first cradle frame, a first cradle frame pivot axis, a first diverter belt, and a first power takeoff belt; and including:

(a) a second cradle frame similar to said first cradle including a second drive sheave, and pivotally supported on said conveyor frame to pivot about a second cradle frame pivot axis parallel to said first pivot axis;
(b) a second diverter belt supported on said second cradle frame and engaging said second drive sheave, and including a first belt transfer portion and a second belt transfer portion, said transfer portions extending transverse to said conveyor frame;
(c) a second power takeoff belt drivingly engaged between said line shaft and said second drive sheave to drive said belt transfer portions of said second diverter belt respectively in said first and second transfer directions; and
(d) a link pivotally connected between said first cradle frame and said second cradle frame such that when said linear motor means pivots said first cradle frame about said first cradle frame pivot axis to said first and second transfer positions, said second cradle frame is simultaneously pivoted about said second cradle frame pivot axis respectively to first and second transfer positions of said second cradle frame.

20. A mechanism as set forth in claim 17 wherein:
(a) said cradle frame is positioned on said conveyor frame with said frame sides on opposite sides of a roller rotatably mounted on said conveyor frame;
(b) said power takeoff belt is engaged between said roller and said line shaft; and
(c) drive transmission means is engaged between said roller and said drive sheave.

21. A mechanism as set forth in claim 20 wherein said drive transmission means includes:
(a) a roller gear rotating with said roller;
(b) a drive gear rotating with said drive sheave; and
(c) said roller gear being meshed with said drive gear.

22. A mechanism as set forth in claim 21 wherein:
(a) said roller is removable from said conveyor frame; and
(b) said power takeoff belt is replaceable without displacement of said line shaft.

23. A mechanism as set forth in claim 22 wherein:
(a) a power takeoff idler sheave is rotatably mounted on said conveyor frame;
(b) said power takeoff belt includes a first end loop engaging said idler sheave;
(c) said power takeoff belt includes a second end loop engaging said roller; and
(d) said power takeoff belt includes first and second intermediate portions intermediate said first and second end loops which engage said line shaft, said first intermediate portion frictionally engaging said line shaft and said second intermediate portion slippingly engaging said line shaft.

24. A mechanism as set forth in claim 23 wherein:
(a) said first intermediate portion of said power takeoff belt engages a fixed line shaft sheave rotating with said line shaft; and
(b) said second intermediate portion of said power takeoff belt engages a freewheeling line shaft sheave which slips relative to said line shaft.

* * * * *